(12) United States Patent
Lovberg et al.

(10) Patent No.: US 7,692,571 B2
(45) Date of Patent: Apr. 6, 2010

(54) MILLIMETER WAVE IMAGER WITH VISIBLE OR INFRARED OVERLAY FOR BROWNOUT ASSIST

(75) Inventors: John Lovberg, San Diego, CA (US); Vladimar Kolinko, San Diego, CA (US)

(73) Assignee: Trex Enterprises Corp., San Diego, CA (US)

( * ) Notice: Subject to any disclaimer, the term of this patent is extended or adjusted under 35 U.S.C. 154(b) by 142 days.

(21) Appl. No.: 12/217,065

(22) Filed: Jun. 30, 2008

(65) Prior Publication Data
US 2009/0002220 A1   Jan. 1, 2009

Related U.S. Application Data

(60) Provisional application No. 60/937,867, filed on Jun. 29, 2007.

(51) Int. Cl.
*G01S 13/00* (2006.01)
*G06F 19/00* (2006.01)

(52) U.S. Cl. ............................. 342/52; 342/33; 342/53; 701/14; 701/16

(58) Field of Classification Search ............. 342/33–35, 342/52, 53; 340/945, 971, 974, 980; 701/14, 701/16
See application file for complete search history.

(56) References Cited

U.S. PATENT DOCUMENTS

| | | | | |
|---|---|---|---|---|
| 5,838,262 A | * | 11/1998 | Kershner et al. | ............ 340/945 |
| 6,216,065 B1 | * | 4/2001 | Hall et al. | ...................... 701/16 |
| 7,019,682 B1 | * | 3/2006 | Louberg et al. | ............... 342/22 |
| 7,091,881 B2 | * | 8/2006 | Judge et al. | .................. 340/979 |
| 7,106,217 B2 | * | 9/2006 | Judge et al. | .................. 340/973 |
| 7,180,476 B1 | * | 2/2007 | Guell et al. | ..................... 345/7 |
| 7,312,725 B2 | * | 12/2007 | Berson et al. | ............... 340/980 |
| 7,365,652 B2 | * | 4/2008 | Scherbarth | .................. 340/974 |
| 7,642,929 B1 | * | 1/2010 | Pinkus et al. | ............... 340/973 |
| 2004/0183697 A1 | * | 9/2004 | Rogers et al. | ............... 340/971 |
| 2004/0217883 A1 | * | 11/2004 | Judge et al. | .................. 340/946 |
| 2009/0002220 A1 | * | 1/2009 | Lovberg et al. | ............... 342/33 |

* cited by examiner

*Primary Examiner*—Thomas H Tarcza
*Assistant Examiner*—Peter M Bythrow
(74) *Attorney, Agent, or Firm*—John R. Ross

(57) ABSTRACT

An imaging system for a rotary aircraft having a millimeter wave imager with visible or infrared overlay. The system includes an active millimeter wave imaging system comprising a millimeter wave transmitter and a millimeter wave phased array receiver for producing millimeter wave images of a landing region, a second imaging system operating at visible or infrared wavelengths to produce visible or infrared images of the landing region, and a processor programmed with a see and remember algorithm for overlaying the visible or infrared images and the millimeter wave images and to save at least one good high-resolution visible or infrared image in case of a brownout event begins to obscuring the visible or infrared images wherein in case of the brownout event the millimeter wave images are overlaid on the at least one good visible or infrared image and not obscured visible or infrared images.

5 Claims, 4 Drawing Sheets

MILLIMETER WAVE IMAGER WITH VISIBLE OR INFRARED OVERLAY FOR BROWNOUT ASSIST

This invention relates to imaging radar systems and in particular to millimeter wave imaging radar systems. This application claims the benefit of Provisional Patent Application Ser. No. 60/937,867 filed Jun. 29, 2007.

BACKGROUND OF THE INVENTION

Rotor wash from a helicopter landing or hovering in ground effect in a dusty or sandy environment can throw enough dust into the air to instantly create zero visibility conditions. According to the US Army Safety Program Aviation Database, from FY2002 to the present there were over 37 Army helicopter accidents attributed to brownout conditions, resulting in multiple deaths and injuries as well as over $181M in equipment damage. A helicopter attempting to land in a desert environment commonly generates an opaque cloud of sand and dust prior to touching down. This is referred to as a "brownout" condition, often leading to disorientation of the pilot and resulting in difficult landings with potential damage to the aircraft and injury to its occupants.

Sensor Wavelength Considerations

The human eye, as well as visible-light cameras and laser radars sensitive to the same electromagnetic radiation band as the human eye, are unable to maintain visual contact with the ground during brownout due to the overwhelming degree of light scattering by sand and dust particles. Near-visible, mid-wave, and long-wave infrared cameras and laser radars, which operate in the 1 to 10 micron wavelength region of the electromagnetic spectrum, are likewise rendered ineffective because the particulate size in the brownout cloud significantly overlaps the detection wavelength, leading again to a high degree of large-angle radiation scatter. At much longer wavelengths, including microwave and lower radio frequencies, radiation propagation is virtually unaffected by the presence of dust clouds; the large difference between particle size and radiation wavelength leads to near-total disappearance of large-angle scattering. Unfortunately, with very long wavelengths it is not possible to discriminate small features on the ground which might pose significant hazard to helicopter take-off and landing operations. The sweet spot in the electromagnetic spectrum, at which dust scattering is ignorable but spatial resolution is still sufficient to ensure safe take-off and landing, is in the MMW region, between about 60 and 240 GHz.

Applicants Prior Art Millimeter Wave Imaging Patents

Milllimeter wave imaging systems are well known. Applicants' prior art millimeter wave imaging patents include the following US patents:

| | | | |
|---|---|---|---|
| 1) | Pat. No. 5,121,124 | Microwave Camera | Jun. 09, 1992 |
| 2) | Pat. No. 5,365,237 | Microwave Camera | Nov. 15, 1994 |
| 3) | Pat. No. 6,937,182 | MM Wave Imaging System | Aug. 30, 2005 |
| 4) | Pat. No. 7,019,682 | Imaging MM Wave Radar System | Mar. 28, 2006 |
| 5) | Pat. No. 7,170,442 | Video Rate Passive MM Wave Imaging System | Jan. 30, 2007 |
| 6) | Pat. No. 7,194,236 | MM Wave Imaging System | Mar. 20, 2007 |
| 7) | Pat. No. 7,248,204 | Security System with Metal Detection and MM-Wave Imaging | Jul. 24, 2007 |

These patents are incorporated herein by reference.

Active versus Passive Sensing

Millimeter-wave sensing comprises both active (radar) and passive (radiometer) technologies. Passive imaging demands the ultimate state-of-the-art in receiver noise performance, resulting in high cost solutions, and further requires at least two distinct imaging apertures in order to establish ranging, an essential component of safe landing information. Because the active radar supplies its own signal power, receiver noise performance is secondary, and ranging is by definition a natural function of radar. For landing applications, radar power requirements are very small, so the only downside to using active radar rather than passive radiometry is an increased probability of detection. For the power levels, operating frequencies, and chirp methodologies employed in MMW FMCW radar, the physical extent of the electromagnetic detection envelope is significantly smaller than any helicopter's acoustic detection envelope, so active radar is an easy choice.

MMW Radar Architecture

MMW radar is characterized by operating frequency, signaling methodology (pulsed versus FMCW), antenna size, transmit power, and receiver sensitivity. Operating frequency selection is limited to some extent by law; the FCC and its world counterparts dictate frequency policy which restricts spectrum use for radiolocation, so as not to conflict with spectrum used for communications or scientific research. The MMW bands available for helicopter brownout landing technology include V-Band (59-64 GHz), E-Band (78-81 GHz), W-Band (92-100 GHz), D-Band (136-148.5 GHz) and Y-Band (238-248 GHz). Lower frequencies cannot provide sufficient spatial resolution from a practical antenna aperture; higher frequencies suffer from increased dust attenuation and reduced availability of mature, practical technology. Other radar characteristics represent tradeoffs among operating range, spatial resolution, field of view, update rate, sensor size, weight and power (SWAP), probability of detection (PD), and system cost. The optimal trade is somewhat subjective and can be determined only through cooperative interaction between the sensor developer and the system integrator (SWAP), customer (cost), and end user (range, PD and performance).

In arid desert terrain, obscured visibility from intense dust clouds (brownout) in helicopter take-off and landing operations commonly creates significant flight safety risks from aircraft and ground obstacle collisions, and/or rollover due to sloped and uneven terrain. Inertial systems aboard a rotorcraft cannot alone provide sufficient situational awareness to a pilot to avoid collisions with moving objects on the ground, and cannot provide suitable feedback to avoid hard landings or rollovers.

SUMMARY OF THE INVENTION

The present invention provides an imaging system for a rotary aircraft having a millimeter wave imager with visible or infrared overlay. The system includes an active millimeter wave imaging system comprising a millimeter wave transmitter and a millimeter wave phased array receiver for producing millimeter wave images of a landing region, a second imaging system operating at visible or infrared wavelengths to produce visible or infrared images of the landing region, and a processor programmed with a see and remember algorithm for overlaying the visible or infrared images and the millimeter wave images and to save at least one good high-resolution visible or infrared image in case of a brown-out event begins to obscuring the visible or infrared images wherein in case of the brownout event the millimeter wave images are overlaid on the at least one good visible or infrared image and not obscured visible or infrared images.

Millimeter-wave imaging with illumination are capable of providing attitude information and landing zone imagery for rotary wing aircraft during low or zero visibility conditions. The requirement of being able to extract real-time situational awareness from the environment in the presence of obscurations resulting from rotor wash is well suited for millimeter wave imaging systems. The longer wavelengths relative to conventional imaging systems operating at the visible or infrared possess a significantly higher immunity to scattering and attenuation.

The key requirements of such a system are to provide an indication of lateral drift as well as provide a real-time image of the landing zone to allow the pilots to see small obstacles on the order of 0.1 m (rocks, bushes, ruts, etc) that could adversely impact the ability of the vehicle to remain level during the last few critical seconds of a landing.

Preferred embodiments operate in the V-Band (57-64 GHz), due to its widely available (license free) fractional bandwidth and its low probability of intercept due to high oxygen absorption, effectively limiting the detectable range of transmitted energy to less than a 1 km radius for a line-of-sight receiver. A RADAR's electronically-scanned field of view (FOV) is given by the product of the number of beams scanned and the width of these beams. Near broadside, for transmit wavelength $\lambda$, the antenna's diffraction limited beam width is simply $\lambda/D$, and the FOV becomes:

$$FOV = N_{beams}\left(\frac{\lambda}{D}\right) = \Delta v \tau_{ant}\left(\frac{\lambda}{D}\right) = \frac{c}{v_{prop}}\left(\frac{\Delta v}{v}\right). \quad (1)$$

Where c is the speed of light in a vacuum and ($\Delta$ v/v) is the fractional bandwidth of the transmitter. Thus, an additional advantage of a V-band RADAR is the high fractional bandwidth available, which may be able to meet a wide field of view requirement without the need to resort to a mechanical steering array. In another embodiment a G-Band (210-230 GHz) RADAR is utilized for its lightweight and compact structure, narrow beam-width and resultant high image resolution capability. Infrared and millimeter wave imagery may be combined providing a display a resultant tomographic scene.

Millimeter-wave (MMW) radar provides a 3-dimensional imaging capability in brownout conditions, as millimeter wavelengths are not strongly attenuated by dust or sand. However, the spatial resolution of MMW imagery is limited by its long wavelength relative to infrared or visible light, such that the MMW radar cannot be used at ranges of several hundred meters or more to pick out a suitable landing zone. In the earliest stages of brownout, the ground footprint (resolution) of the MMW radar is typically of the order of 1 meter by 1 meter, potentially insufficient to discriminate protrusions from smaller rocks or stumps which could hinder a safe landing.

A pilot's eyes, and imaging systems of equivalent resolution in the visible and infrared portions of the electromagnetic spectrum, are able to select a suitable landing zone well in advance of the onset of brownout conditions, which are caused by rotor downdraft only during the final descent stage of the helicopter. This application teaches a means for overlaying a static high-resolution image, taken prior to brownout with a visible light (CCD or CMOS-based) sensor or infrared (short-wave, mid-wave, or long-wave) camera with a dynamic MMW radar image to provide the contextual benefits of the high-resolution imagery along with the penetrating ability of the MMW radar.

An image from a high-resolution video or infrared camera is captured as the helicopter nears a chosen landing site, and is registered in real time against a 3-dimensional MMW radar image, using a multi-modal image registration algorithm based upon localized wavelet transforms. By its nature, this type of registration algorithm allows for slight warping of one image relative to the other, in scale factor, translation, tip, tilt and rotation. The resulting correlation matrix describing the scene registration is then repeatedly updated using the dynamic MMW radar imagery against the captured, static high-resolution image. The static image is continuously remapped onto a suitable ground projection based upon the original high-resolution data and the scale, translation, tip, tilt and rotation factors from the updated correlation matrix, and the resulting (high-resolution) projection is presented to the pilot along with the radar range data on a display monitor. The pilot lands the aircraft based upon height information from the radar and projection information from the static image. As the helicopter height above ground level decreases, the radar footprint also decreases, improving the resolution of the radar projection and along with it the quality of the dynamic/static scene registration. Protrusions from the landing surface, as detected by the radar, are displayed with a shaded gray-scale or artificial color scheme to present a suitable 3-dimensional image for landing assist.

MMW/IR Sensor Fusion

While MMW radar provides sufficient penetration and resolution to enable safe helicopter landing at a specified location, the beamwidth of MMW radar (typically a few tenths of a degree, up to one degree) cannot resolve ground features with sufficient resolution to allow preferential landing zone selection from long distances. Commercial off-the-shelf (COTS) active and passive visible and IR solutions exist with this requisite resolution, but these will be obscured during brownout events in the terminal hover and landing phase. By selecting a landing zone using a visible or IR sensor and then transferring the landing zone selection onto the MMW radar prior to brownout, the MMW radar can then provide all further dynamic inputs (3-D translation, rotation, pitch and roll) to safely guide the helicopter to the target location. A simple see-and-remember algorithm can synthesize imagery from the last good high-resolution data, and can additionally identify moving objects on the ground against the stationary landing zone background. This complete solution provides all of the necessary requirements (spatial resolution, temporal resolution, drift rate, descent speed, distance-to-ground, hazard detection and characterization) to allow for safe helicopter take-off and landing in DVE environments.

The heart of the radar architecture is a novel frequency-scanned, phased-array antenna that Trex has used successfully in video-rate passive MMW imaging for airborne and security applications, as well as in 3-D video-rate active imaging for a helicopter Cable Warning/Obstacle Avoidance System (CWOAS) prototype. The latter prototype was developed for the US Army Research and Development Command (RDECOM) Night Vision and Electronic Sensors Directorate (NVESD) with an ultimate goal toward forward-looking power-line avoidance applications, requiring 500-meter standoff detection of ⅜-inch coated and uncoated wires at up to 60-degree obliqueness, in all weather. Applicants' unique CWOAS MMW phased-array Radar and its component technologies are covered under 3 US patents and 6 additional patents Pending. The present invention leverages the CWOAS technology development, reducing risk by utilizing a proven methodology at lower transmit power levels and lower transmit and receive antenna gains than have been already demonstrated. Existing CWOAS hardware proves the innovative claims for unprecedented "voxel" (3-D pixel) update rates at state-of-the-art spatial resolution and exceptionally low cost.

In addition, a forward-looking CWOAS front end can share the processor and display processing electronics with the down-looking Sandblaster front end to provide dual in-flight cable/obstacle avoidance and brownout landing assist functionality from the single installed system.

The design should reflect optimal tradeoffs based upon discussions with end users and upon preliminary and critical design reviews with the customer, but preferably it should achieve at a minimum the following specifications:

| | |
|---|---|
| Instantaneous FOV | 60 degrees crossrange (azimuth) by 30 degrees down-range (elevation) |
| Image Update Rate | 60 Hz |
| MMW Ground Footprint Resolution/ IR "See and Remember" Resolution | 15 milliradians (15 cm from 10 m)/ 1 milliradian (15 cm from 150 m) |
| MMW Range Resolution | 20 cm |
| Operating Range | 150 meters |
| Drift Rate Accuracy | 1 knot (any direction) |

The flexible FMCW radar architecture allows the Trex team to select a suitable local oscillator in any band from V-Band (59-64 GHz) to E-Band (136-148 GHz) to upconvert an existing, proven microwave linear sweep module to the desired transmit band. This enables RF band selection depending upon trades between probability of detection, field of view, and range resolution, without impact to back-end digitizing, Fourier Transform, or display electronics. The benefits of several available RF bands will be considered during the initial technology down-selection phase of the contract, as will customer and end-user preferences toward high-resolution imaging technologies (active or passive visible or IR). Final specifications on sensor and processor size, weight and power, as well as system form factor, will flow down from these selections.

The major changes in the radar's operational requirements relative to those of the earlier Hazard Avoidance design are those of significantly decreased operating range and significantly increased range resolution. Shorter ranges and larger return cross-sections lead to simplifications of the transmitter design, particularly in eliminating the need for a high-power millimeter-wave (MMW) amplifier, and of the receiver design, in eliminating the need for a low-noise MMW phased array receiver. On the other hand, the shorter operational range, as well as the need for greatly increased range resolution, limits the size of the antenna aperture that can be utilized (as will be shown) and thus restricts the achievable angular resolution of the radar.

Ability to Solve All Aspects of Brownout Piloting Challenge

Brownout piloting challenges arise due to pilot uncertainty as to hover height, rate of descent, drift speed in lateral, fore and aft directions, slope and evenness of terrain, and existence and location of fixed and moving ground obstacles. Brownout-related accidents most commonly involve collisions with ground obstacles, vehicles or aircraft, or rollover due to uneven landings with non-zero lateral drift. A comprehensive technology solution for pilot assistance in brownout must therefore be capable of determining aircraft height above the ground and rate of descent, drift velocity (speed and direction), terrain characteristics, and the presence of fixed or moving hazards on the ground. The MMW/IR solution proposed by Trex and its team addresses all of these needs with sufficient resolution and accuracy to solve all requirements for safe piloting in brownout or other degraded visual conditions. At a minimum, the sensor package will allow a pilot to select a preferred landing site from at least a 500 foot slant range, and to perform hover and descent maneuvers throughout a brownout event. In the last 100 feet above the ground, the sensors will report and display, at a 1 Hz update rate, the following information: descent rate, to within 3 inches per second; drift speed and direction, to within 1 knot (20 in/sec) and 1 degree respectively; and a terrain map (including fixed and moving ground obstacles) showing ground height and surface roughness with 4-inch height resolution at a grid granularity of less than 18 inches. The data will be displayed dynamically on a head-down display showing a 3-D wire-grid-type terrain map with an exaggerated height scale and an easy-to-interpret symbology overlay indicating target landing zone location as well as drift speed and direction.

DETAILED DESCRIPTION OF PREFERRED EMBODIMENTS

First Preferred Embodiment

A first preferred embodiment of the present invention, sometimes herein referred to as the "Sandblaster Imaging Radar" or the "Sandblaster" comprises an FMCW radar using a bi-static MMW antenna assembly. The antenna assembly for the baseline (D-Band) concept measures only 6"×7"×1". The only MMW components required for the radar are a local oscillator for the transmitter section and an array of mixer diodes for the receiver section, allowing for simple interchange of the radar front end between V-Band (60 GHz), E-Band (80 GHz), W-Band (95 GHz) D-Band (140 GHz), and Y-Band (240 GHz). Moreover, the antenna/MMW front-end assembly weighs only 3 kg and can be easily swapped out if damaged in battle. The MMW radar provides full 3-dimensional imaging capability at a 120 Hz update rate for narrow field (electronically-scanned) and 1 Hz update rate for wide field (mechanically-scanned) imaging.

Figure 1:
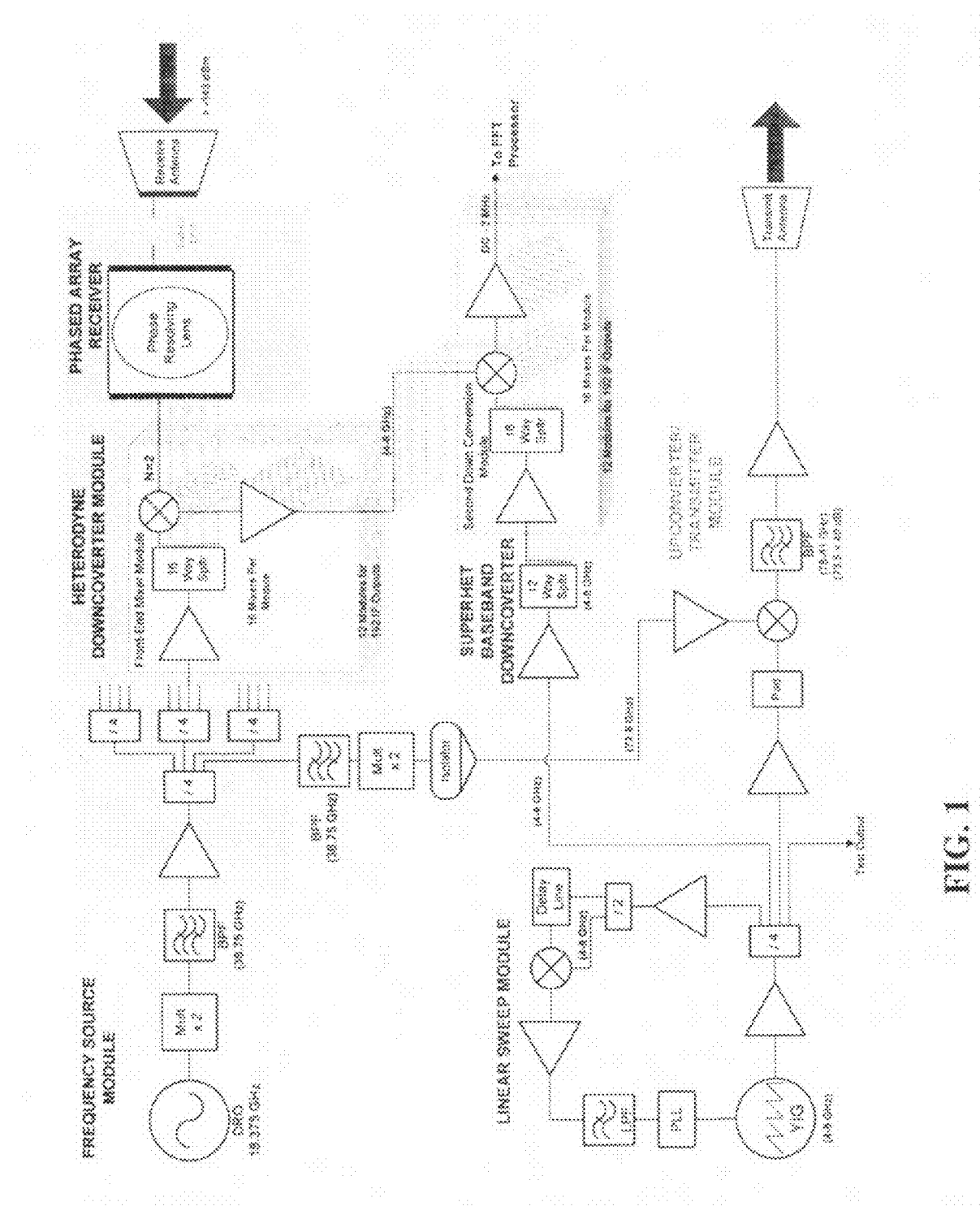
FIG. 1 is a block diagram of a preferred embodiment of the present invention.
Figure 2A:
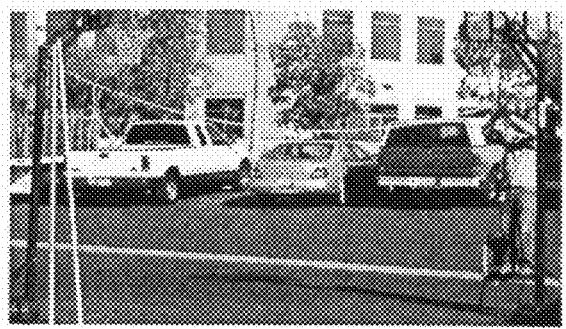
FIGS. 2A and 2B show a visible image and a millimeter wave image of a thin cable.
Figure 2B:
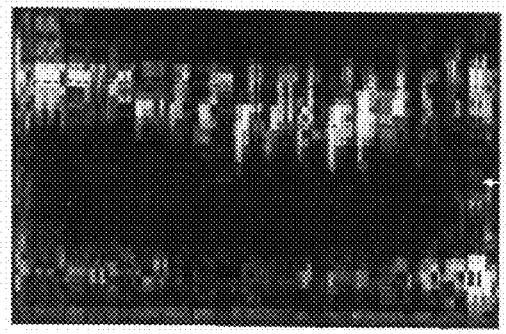

A block diagram of the FMCW radar system is shown in FIG. 1. The radar system is similar to the system described in U.S. Pat. No. 7,019,682 referred to in the background section and incorporated herein by reference. The transmit antenna is frequency-scanned along its signal propagating direction, such that the chirped frequency module source sweeps a wide fan beam across the radar field of view. The phased array antenna receives the radar return and a phase resolving lens in the receiver dissects the return into a large number of horizontal "pixels." During the two-way time of flight of the radiation leaving the transmit antenna, the transmitter frequency changes by an amount equal to the chirp rate (typically 1.5 kHz/nsec) times the two-way time-of-flight (6.7 nsec per meter distance to target). Thus the return signal differs from the transmit signal by an amount equal to 10 kHz per meter target distance. The return signal is mixed with the transmit signal to output this difference frequency, which is analyzed using a digitizer/fast-Fourier-transform (FFT) processor circuit at each pixel to yield a two-dimensional azimuth-range plot at a fixed elevation. Over the 8.3-millisecond chirp period of the transmit oscillator, the antenna sweeps across a number of (typically 16) distinct elevation beams to complete the third dimension of the final image. A pair of fixed transmit antennas are used to sweep 32 beams across a full 30-degree field of view without gimbals.

Benefits over Other Radar Design Architectures

The Applicants FMCW imaging radar is electronically-scanned in two directions, so it does not require any mechanical motion to create a three-dimensional image. The instantaneous (60 Hz) data output covers a 60° cross-range (azimuth)×30° downrange (elevation) field of view, with the capability for slow rotation on a single axis to compensate helicopter motion and maintain fixed elevation, or to slew the radar forward for cable detection or downward for a more vertical descent. Other radars typically require complicated mechanical rotary joints to achieve a wide field of view, slowing the image update rate and increasing system cost, weight and complexity.

Band Selection Criteria

The ability of MMW to penetrate dust, sand, smoke, clouds and fog is similar across the entire MMW spectrum from 30 to 300 GHz. Higher frequencies are beneficial because they allow for smaller antenna apertures to achieve a fixed angular resolution requirement, and allow for wider depth of focus. Lower frequencies are generally served by more mature, less lossy or noisy, and less expensive MMW components. Other considerations, including spectrum management, fractional bandwidth, atmospheric propagation, and probability of detection, play significantly into the selection of the optimal operating band.

Spectrum Management Considerations

The FCC and its international counterparts have designated slices of the electromagnetic spectrum for radiolocation, or radar technology. In the MMW spectrum above 50 GHz, these slices are at V-Band (59 to 64 GHz), E-Band (76 to 77.5 and 78 to 81 GHz), W-Band (92 to 95 GHz), D-Band (136 to 148.5 GHz) and Y-Band (238 to 248 GHz). All of these bands are candidates for the Sandblaster radar, but each represents a trade between antenna size, spatial resolution, electronically-scanned field of view, and probability of detection.

Fractional Bandwidth Considerations

The number of antenna beamwidths $N_{beams}$ scanned by a frequency-scanned antenna is given by the product of the transmit bandwidth $\Delta v$ and the signal propagation period in the antenna, $\tau_{ant}$. The radar's electronically-scanned field of view is given by the product of the number of beams scanned and the width of these beams. Near broadside, for transmit wavelength $\lambda$, the antenna's diffraction limited beamwidth is simply $\lambda/D$, and the FOV (in radians) becomes:

$$FOV = N_{beams}\left(\frac{\lambda}{D}\right) = \Delta v \tau_{ant}\left(\frac{\lambda}{D}\right) = \frac{c}{v_{prop}}\left(\frac{\Delta v}{v}\right). \quad (1)$$

Here c is the speed of light in a vacuum, $v_{prop}$ is the signal propagation speed in the antenna, and $(\Delta v/v)$ is the fractional bandwidth of the transmitter. Since the frequency-scanned field of view of the transmit and receive antennas is proportional to the fractional bandwidth of the transmitter, the FCC band allocations (listed in section 2.2.3.1) with the largest contiguous fractional bandwidth are preferable. Comparing the fractional bandwidth in these bands:

TABLE 1

| Operating Band | Allocated Fractional Bandwidth |
|---|---|
| V-Band (61.5 GHz) | 8.1% |
| E-Band (79.5 GHz) | 3.8% |
| W-Band (96 GHz) | 8.3% |
| D-Band (142.25 GHz) | 8.8% |
| Y-Band (243 GHz) | 4.1% |

From the consideration of Field of View, then, the V-Band, W-Band, and D-Band options are preferable for the Sandblaster imaging radar.

Receive Aperture Considerations

In order to achieve a 1-degree drift heading accuracy at a high update rate, the diffraction-limited beamwidth of the radar's receiving antenna must be narrower than 1 degree. The diffraction limit for a square aperture with uniform illumination is $0.88\lambda/D$, and with a 10-dB cosine taper (for reduced sidelobes) it is very close to $\lambda/D$. Equating this to the 1-degree heading requirement, the required antenna size for each operating band is given in table 2.

TABLE 2

| Operating Band | Minimum Antenna Size |
|---|---|
| V-Band (61.5 GHz) | 11.0 inches |
| E-Band (79.5 GHz) | 8.5 inches |
| W-Band (96 GHz) | 7.0 inches |
| D-Band (142.25 GHz) | 4.75 inches |
| Y-Band (243 GHz) | 2.75 inches |

From considerations of system size, then, the W-Band, D-Band, and Y-Band options are preferable for the Sandblaster Imaging Radar.

Atmospheric and Low Probability of Detection (LPD) Considerations

Figure 3:
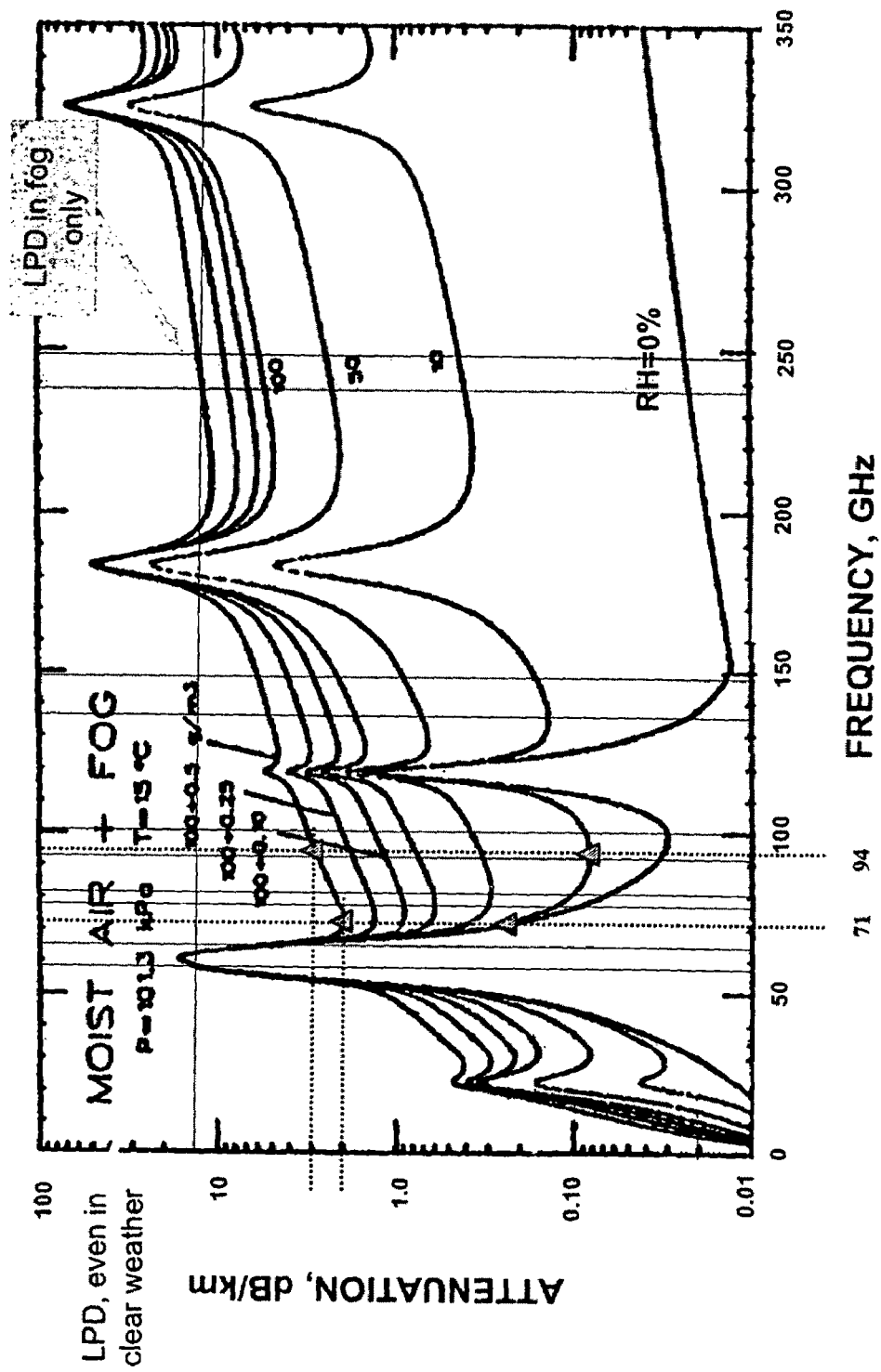
FIG. 3 shows attenuation of millimeter wave radiation.

While all of the allocated MMW radar bands are appropriate for brownout landing assistance, probability of detection from hostile forces varies greatly depending upon operational frequency. FIG. 3 below shows atmospheric attenuation versus frequency for parametric curves of increasing humidity and water vapor. At nonzero humidity, attenuation due to water vapor increases with frequency, to the extent that Y-Band is attenuated by more than 10 dB per kilometer in heavy fog. This does not limit the operational range of the Sandblaster radar, since ranges of interest are less than 0.2 km, but this attenuation creates a veil around the radar to limit its detectability from hostile forces. Unfortunately, as soon as the fog lifts, the Y-Band veil also disappears. At V-Band, however, attenuation from rotation lines in atmospheric oxygen (FIG. 3) reaches 15 dB per kilometer, independent of the weather. This creates an opportunity for extreme LPD operation with the selection of this operating band. In general, however, the combination of the narrow radar beamwidth (less than 1 degree by requirement), the down-looking transmit pattern, and the low sidelobes required for radar imaging ensure that the probability of hostile detection will be quite low for operation in any MMW band.

Antenna Design

Figure 4:
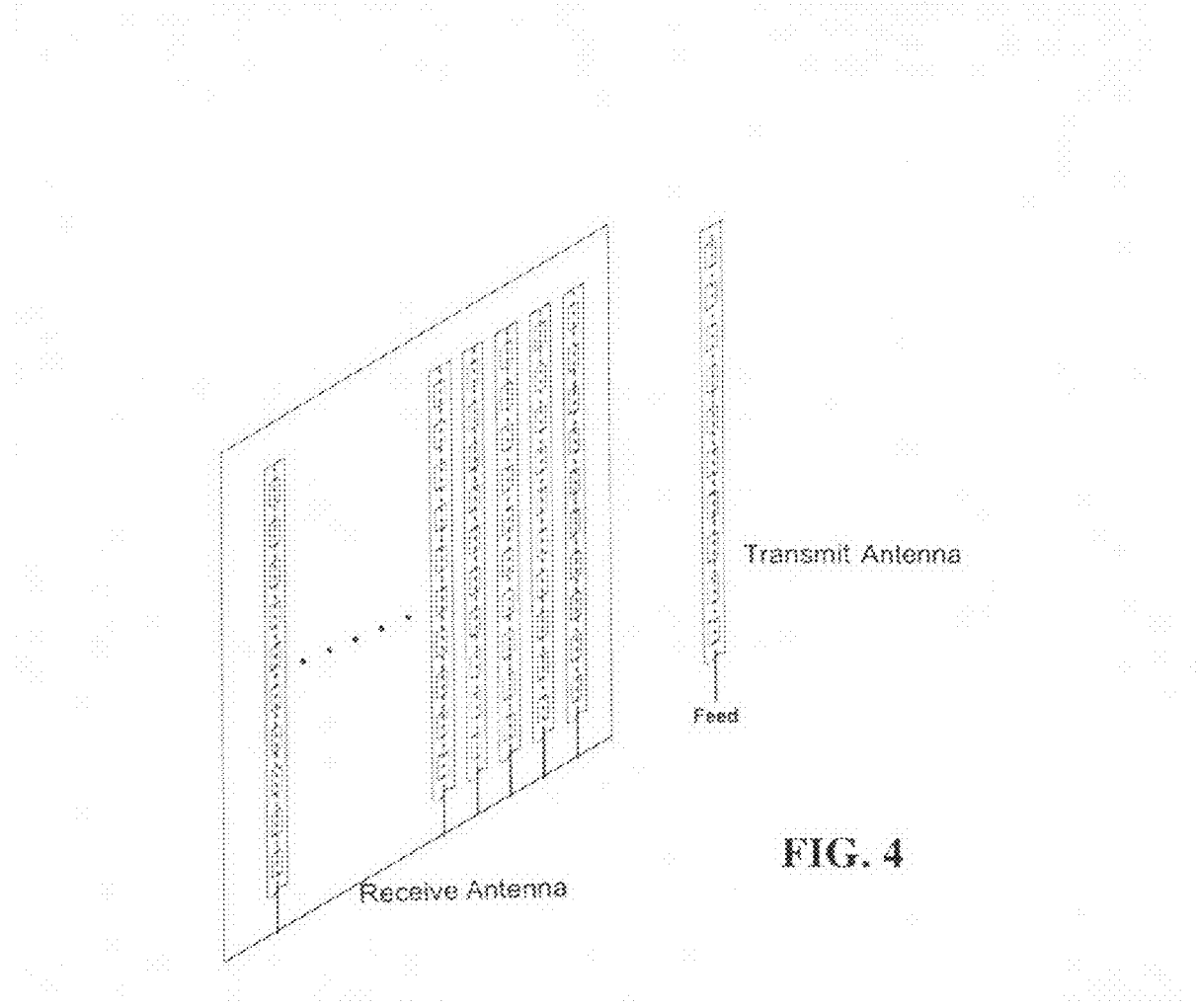
FIG. 4 shows two views of a preferred millimeter wave antenna.

The transmit antenna for the FMCW radar is comprised of a traveling-wave stripline feed with regularly-spaced radiation couplers, to act as a frequency scanned array as shown in FIG. 4. When the wavelength of a signal propagating on the stripline is matched to the coupler spacing, the wave phase is identical at every coupler, and a broadside (horizontal) beam is launched from the antenna. If the propagating wavelength is shorter or longer than the coupler spacing, a phase advance or retardation is affected between slots, and the beam launched from the antenna is steered away from the antenna feed (upward) or back toward the feed (downward). Along the antenna length direction, the transmitted beam is less than 1 degree wide, but in the orthogonal direction it is more than 60 degrees wide, forming a broad fan beam that is swept across the field of view by the transmitter's chirped frequency source.

The receive antenna is comprised of a phased array of stripline elements identical to the single-element transmit antenna, also shown in FIG. 4. Thus the directionality of this antenna versus frequency matches that of the transmit antenna exactly, but after combining the phased array elements in a phase sorting (e.g. Rotman) lens, the width of the phased array antenna pattern is less than 1 degree in both orthogonal directions.

Antenna Size Considerations

The radar antenna size impacts both the projection spatial resolution and the range resolution of the imaging radar. Smaller antennas are generally preferable from a form factor (ease of integration) standpoint, and they also provide larger depth of focus for short-range operation.

Projection Spatial Resolution

The antenna size dictates the beamwidth, and thus the ground footprint and the spatial resolution of the radar image projection. The diffraction limited beamwidth for a square aperture with a 10-dB cosine amplitude taper is about $\lambda/D$, the ratio of the detected wavelength to the antenna dimension. In any operating band, then, a larger antenna provides better resolution than a smaller antenna (the minimum antenna size consistent with a 1-degree directionality requirement is listed for each candidate operating band in table 2). On the other hand, for our traveling wave antenna, the radar's range resolution goes inversely with the antenna size, as will be shown in the next section. The optimal antenna size, then, is a trade between projection resolution and range resolution requirements.

Range Resolution

The range resolution of the radar is ultimately related directly to the sampling period of the radar antenna, as will be shown. The time that the transmit beam dwells on a small target $\tau_{target}$ is the ratio of the scan time $\tau_{scan}$ and the number of beams scanned, such that:

$$\tau_{target} = \frac{\tau_{scan}}{N_{beams}} = \frac{\tau_{scan}}{\Delta \nu \tau_{ant}}. \tag{2}$$

For the FMCW radar, range resolution (i.e. frequency resolution) is maximized by sampling the entire time-on-target in the FFT processor. The frequency resolution $\delta\nu_{FFT}$ of the processor, which is given by the inverse of this sampling time, is divided by the frequency chirp rate ($\Delta\nu/\tau_{scan}$) to determine the smallest differential in the signal's two-way time-of-flight $\delta\tau_{tof}$ (and thus differential range $\delta R$) that can be distinguished by the radar, as follows:

$$\delta\nu_{FFT} = \frac{1}{\tau_{FFT}}; \tag{3}$$

$$\delta\tau_{tof} = \delta\nu_{FFT}\left(\frac{\tau_{scan}}{\Delta\nu}\right) = \frac{1}{\Delta\nu}\left(\frac{\tau_{scan}}{\tau_{FFT}}\right) \Rightarrow$$

$$\delta R = \frac{c\delta\tau_{tof}}{2} = \frac{c}{2\Delta\nu}\left(\frac{\tau_{scan}}{\tau_{FFT}}\right).$$

Equating the transmit beam's time on target with the FFT sampling time and substituting equation 2 into equation 3, then:

$$\delta R = \frac{c}{2\Delta\nu}\left(\frac{\tau_{scan}}{\tau_{target}}\right) = \frac{c\tau_{ant}}{2}. \tag{4}$$

This simple relationship verifies the intuitive conclusion that the smallest two-way time-of-flight differential that can be measured by the radar is equal to the instantaneous sampling period of the antenna. The sampling period of the antenna is related to the length D of the traveling-wave antenna through the relation:

$$\tau_{ant} = \frac{D}{v_{prop}},$$

where $v_{prop}$ is the signal propagation speed in the antenna. Rewriting equation (3) in terms of antenna size and speed:

$$\delta R = \frac{c}{v_{prop}}\left(\frac{D}{2}\right). \quad (5)$$

Thus range resolution is improved either by shrinking the antenna (thereby degrading cross-range resolution) or by increasing propagation speed (which decreases frequency-scanned FOV, as shown in equation 1 above). This trade represents a subjective trade driven by end user preferences and system requirements which will be evaluated at the onset of the program.

Antenna Substrate Considerations

According to equation 1, the frequency-scanned field of view of both the transmit and receive antennas is proportional to the fractional bandwidth of the transmitter, and is inversely proportional to the propagation speed in the antenna. Thus signal propagation speed in the traveling wave antenna determines both the frequency-scanned field of view (equation 1) and the radar's range resolution (equation 5). In general, a slower antenna provides more field of view but coarser range resolution. Like antenna size, which trades projection resolution against range resolution, the selection of antenna speed (i.e. substrate dielectric constant) represents a subjective trade driven by end-user preferences and system requirements which will be evaluated at the onset of the program.

Sidelobe and Grating Lobe Considerations

Antenna sidelobes must be kept low to eliminate ghosting in the radar's 3-D ground image. A large ground obstacle in the periphery of the radar field of view may not represent a landing hazard, but will still generate a strong return at its location in the image. The same return will also show up as a "ghost" (sidelobe) elsewhere in the 3-D image, with amplitude suppression equal to the radiation suppression level at the sidelobe's differential angle relative to the main beam. Sidelobe suppression of 25 dB, in conjunction with hardware (logarithmic gain slope) and software (correlation algorithm) enhancements, should be sufficient to eliminate ghosting in the Sandblaster mission, especially in light of the relatively limited differential range and cross-section between the closest and farthest objects of interest in the ground environment.

On the other hand, grating lobes from a phased array can be a significant problem if the antenna element spacing is made too coarse. The short operating range of the Sandblaster radar obviates any array of low-noise amplifiers between the antenna and the phase processor (Rotman lens), so it the antenna can easily be populated with elements at half-wavelength spacing, thereby eliminating any possibility of grating lobes.

Phased Array Processor Design

Figure 5:
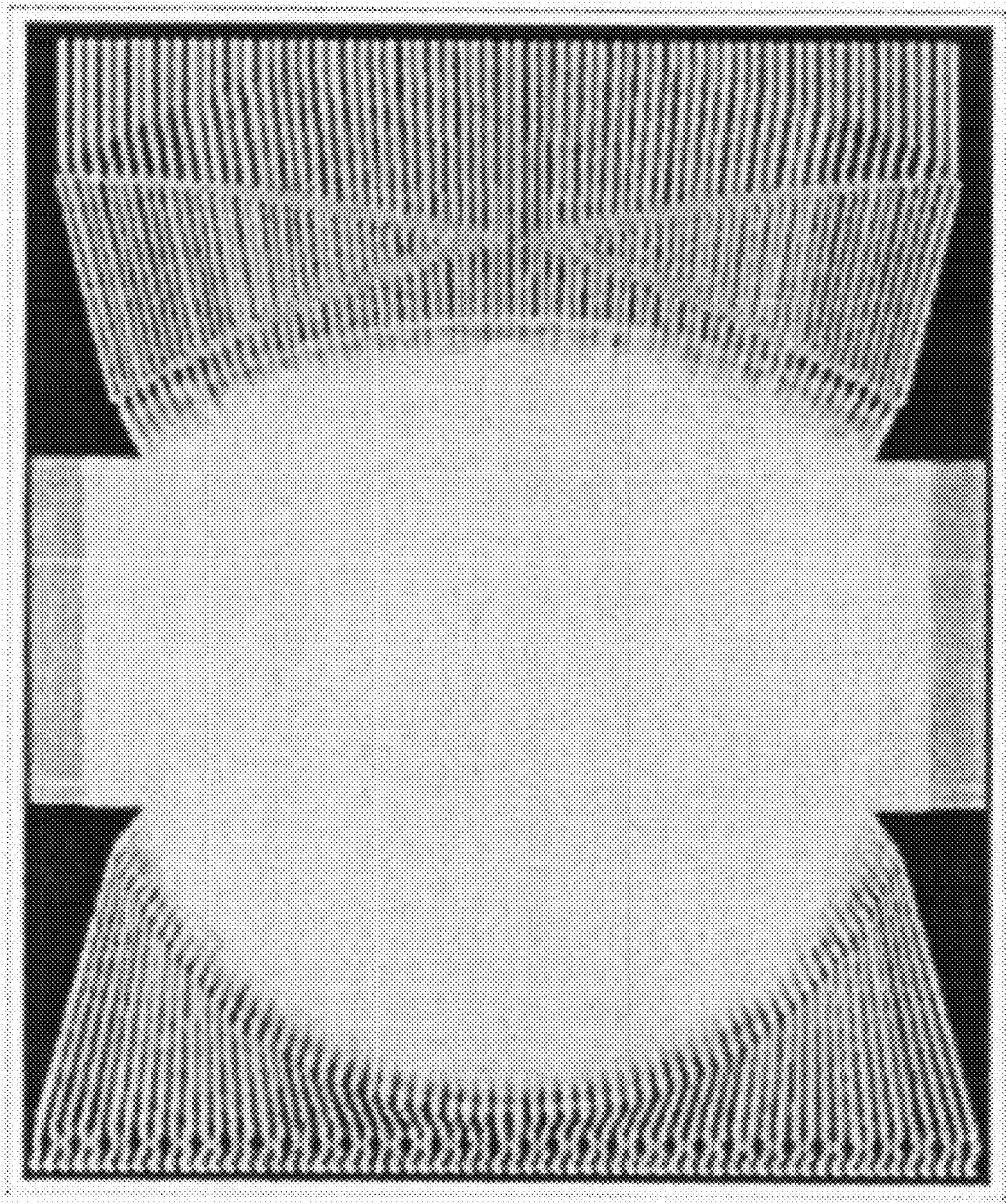
FIG. 5 shows a circuit board that is an important part of a phased array processor.

The phased array processor for the Sandblaster radar is based upon a proven Rotman-lens variant used successfully at Trex in phased-array Passive MMW imagers at 75-94 GHz, and in phased-array Active Imaging Radar at 78-81 GHz. The basic lens design is described in the prior art patents referred to in the Background section. The baseline design for the Sandblaster phased array processor, shown in FIG. 5, has 128 input channels and 64 output channels across a 6-inch overall board width. This arrangement covers a 60 degree antenna field of view without grating lobes, with an output for each 15-milliradian interval in azimuth. Radiation is probe-coupled out of the lens into a set of eight 8-channel superheterodyne receiver modules.

Phased Array Processor Circuit Material Considerations

The phased array processor is comprised of a stripline network on ultra-low-loss circuit board material. Stripline transmission lines of 50-ohm impedance, constructed on commercially-available high-frequency substrate materials (e.g. Rogers Duroid 5880), have a minimum of 1.2 dB signal loss per inch at W-Band. For the Sandblaster radar, without an array of low-noise amplifiers between the antenna and phase processor, losses in the processor directly affect the radar power budget, necessitating a compensatory increase in transmitted power. Even with these losses, the transmit power required would be achievable, but the impact on system size, weight and power, as well as the implications to probability of detection, are clearly unfavorable.

The primary loss mechanism in the circuit is ohmic loss in the copper conductor material, followed by dielectric loss in the substrate itself. The skin depth of the signal propagating in the copper conductor is only about 200 nanometers, about one-tenth the roughness of the rolled copper used in commercial flex circuit materials. This results in an effective increase in the physical length that the signal must travel over and around surface features in the copper. Substituting specially-prepared copper with 200 nanometer smoothness reduces ohmic losses by a factor of two relative to commercially available materials. Substituting polypropylene for the engineered substrates in commercial flex circuit reduces dielectric losses as well, such that the measured losses in 50-ohm stripline drop from 1.2 dB/in on Duroid 5880 to 0.55 dB/in on Trex's custom material. This material has been used extensively in several Trex embodiments of active and passive MMW imagers.

Estimated System Performance

The expected performance of the proposed system flows down from baseline designs for the radar antenna, receiver and FFT processor and from the baseline concept for the high-resolution imaging sensor.

System Design Specifications

For purposes of this section, the baseline radar configuration comprises a D-Band transmitter with a 6-inch square receive antenna and a 64-channel, 1024-point FFT processor.

System design specifications and resulting imaging performance predictions for this baseline system are summarized in Table 3.

TABLE 3

| Operating Parameter | Baseline Specification |
| --- | --- |
| IR Camera Operating Range | 150 meters |
| IR Camera Resolution (wide field/zoom) | 1/0.3 milliradians (15/5 cm from 150 meters) |
| MMW Radar Operating Range | 1 meter to 150 meters |
| Radar Projection Resolution | 15 milliradians (15 cm from 10 m) |
| Radar Range Resolution | 20 cm |
| MMW Antenna Size | 14 cm × 14 cm (×2) |
| Radar Operating Frequency | 136-148.5 GHz |
| Transmit Power | 10 mW |
| Image Update Rate | 60 Hz |
| Instantaneous Field of View (Fixed Antenna) | 60° H × 30° V |
| Image Pixels | 64 H × 32 V (×512 deep) |
| RF Chirp Time (Rate) | 8.33 milliseconds (1.5 kHz/nsec) |
| IF Frequency/Range Coefficient | 10 kHz/meter |
| IF Bandwidth | 10 kHz-500 kHz |
| A/D Sample Rate | 1 Msps per channel in 64 channels |
| FFT length | 1024 points per channel in 64 channels |
| Antenna Type | 128-element coupled stripline phased array |
| Antenna Element Spacing | 1.10 mm |
| Antenna Substrate | Polyethylene ($\epsilon_r = 2.3$) |
| Antenna Far Field Range | 9 meters |
| Radome Focal Distance | 9 meters |
| Depth of Focus | 4 meters to 50 meters |

System Performance Predictions for Successful Brownout Piloting Assistance

The predicted performance of the IR/MMW Brownout Assist system follows from Table 3 above. In the typical operational scenario, a pilot identifies a preferred landing zone from a slant range of approximately 150 meters, based upon infrared imagery. MMW radar imagery captured concurrently is correlated against the IR imagery (based upon edge detection) and co-registered with the high-resolution image data, quantifying the size of the landing zone and identifying major obstacles (such as buildings, trees, or power poles) in its vicinity. This real-time image fusion is updated continually, with the correlation algorithm retaining lock on the pilot-specified landing spot, up until the onset of a brownout event. At this point the MMW radar image becomes the primary sensor, providing continuous drift, translation, rotation, pitch and roll information (augmented by inertial systems on the airframe), and generating a video-rate, 3-D view of the landing zone. The system may optionally continue to overlay the last-good IR image (with perspective warping appropriate to the aircraft motion sensed by the MMW), but the MMW alone will provide the situational awareness dynamics to track moving objects in the landing zone. The MMW radar continually remaps the landing zone with increasing cross-range resolution until touchdown.

In this scenario, the precision of the landing zone designation is given by the IR sensor resolution (<5 cm from a 150 m slant range). The pilot's ability to land the airframe exactly at the designated location is limited by the quality of the IR/MMW correlation at the onset of brownout. Assuming that this takes place at a hover distance of 30 meters above the ground, the circular error projection (CEP) precision of the target landing zone will be 0.5 meters. From the same (30 m) height, a displacement equal to the ground footprint of a single radar beamwidth (0.5 meters) in one second corresponds to a fore-and-aft or lateral drift rate of 1 knot. Integration of the airframe IMU onto the stroke display allows for corroboration of the direct measurement, and allows for 1-knot speed with directional precision of better than 1 degree.

The 20 cm range resolution of the radar is sufficient to measure an average terrain slope of less than 4 degrees across a ground footprint corresponding to the width of the UH-60 air frame, and less than 1 degree across the UH-60 length. The absolute measure of slope relies on the existence of an accurate nadir reference vector from the aircraft's IMU. During descent, the radar continually updates and displays a ground contour map with 20-cm height resolution, on a grid of decreasing granularity (15 cm from 10 meters AGL, 7.5 cm from 5 meters AGL, etc.), to identify smaller hazards (stumps, wires, etc.) within the vicinity of the landing zone.

TABLE 4

| Performance Metric | Expected Performance |
| --- | --- |
| Landing Zone Designation Precision | 15 cm |
| Landing CEP | 50 cm |
| Landing Zone Slope Discrimination | <4 degrees (lateral), 1 degree (fore and aft) |
| Drift Speed Resolution | 1 knot |
| Drift Heading Resolution | 1 degree |
| Height Above Ground Level Precision | 20 cm |

Physics Modeling

The efficacy of active MMW radar for pilot assistance in brownout landings is predicted first using simple physics modeling. Direct MMW absorption by dust and sand is inherently low due to the small dielectric loss tangent of silica, so most beam attenuation is via electromagnetic scattering. For typical dust particles (<99% are smaller than about 40 microns; fewer than one in a million are larger than 800 microns), the radar wavelength (e.g. 2.1 mm at D-Band) is significantly longer than the dust size (radar scattering scale-size parameter $\chi \equiv 2\pi r/\lambda \approx 0.1$). In this regime, millimeter waves are affected mostly by small-angle Rayleigh scattering, and larger-angle Mie (or resonance) scattering is almost non-existent. The modeled result is that typical backscattering efficiency under these conditions is quite low, yielding an effective scattering cross-section of less than 0.1% of the physical cross-section of the particle. This results in line-integrated scattering losses across a 100 g/m² dust cloud of less than 2 dB at 100 GHz.

Empirical, Supporting Data from Dust Tunnel Testing

Empirical measurements of MMW beam attenuation from recent testing at the Midwest Research Institute in Kansas City, Mo., have supported the simple physics modeling discussed in the previous section. Researchers at the US Army Research Laboratory, conducted comprehensive tests of beam attenuation by dust scattering in the MMW frequency spectrum from 35 GHz to 220 GHz. Attenuation increases with frequency, as expected, but even at 220 GHz the measured mass extinction coefficients from Iraqi and Yuma sand are less than $10^{-3}$ m²/g. Even given a dust concentration as high as 3 g/m³, and a dust cloud of 30 meters in height, the two-way radar signal attenuation consistent with these measurements is less than 3 dB at D-Band.

FMCW Radar Operating Frequencies

Advantages and disadvantages of allocated MMW frequency bands between 50 and 300 GHz have been discussed previously in section 2.2.3. The selection of a frequency band for the Sandblaster FMCW radar component involves trades between range resolution, cross-range resolution, field of view, and technology maturity. As such, optimization of this selection involves a subjective weighting of performance metrics in order to establish an objective figure of merit for each band. This subjective weighting must necessarily include input from the customer and from end users (pilots), and will certainly also require feedback from same in modeling and simulations developed during the initial phase of the program.

The baseline FMCW radar concept is based upon the FCC-allocated radiolocation band at D-Band (136-148.5 GHz). Feasibility of building the radar in this band has already been established, based upon tested hardware and measurements from an existing E-Band (78-81 GHz) system of the same block design. Since the E-Band hardware utilizes a superheterodyne receiver and transmitter mixing a lower-frequency microwave linear sweep module with a fixed-frequency millimeter-wave oscillator for MMW frequency generation, the final band selection (V, W, E, D, or Y) is accommodated simply by selecting the frequency of the local oscillator. The antenna, phase processor and transition concepts have likewise been demonstrated at frequencies from X-Band (9 GHz) to W-Band (94 GHz) in Passive Millimeter-wave Imaging architectures delivered by Trex to the US Army Research Laboratory between 1994 and 2006.

High-Resolution Imaging Sensor

Key considerations for the Sandblaster infrared camera are its spatial resolution and instantaneous field of view. In order to achieve a 1 milliradian spatial resolution, a wide-field imaging camera with a 30×30 degree field of view requires a focal plane with at least 512×512 pixels. Trex has considerable experience fusing 94 GHz MMW imagery with long-wave infrared (LWIR) imagery from large-format (640×512) focal plane arrays built by QuipTech of Altadena, Calif. Using a 25 mm IR camera lens, the inherent resolution of these (25 μm) LWIR pixels is 1 milliradian; zooming to 75 mm, the resolution increases a factor of three, with a proportional reduction in field of view.

The nature of the Sandblaster brownout landing assistance application (landing zone selection with handoff to MMW radar) does not preclude the use of MWIR technology, as spatial resolution rather than obscurant penetration is the most critical parameter for its intended use. SWIR and visible options might offer superior resolution as well, but lack utility for nighttime operation and so are not likely candidates for downselect in this phase. Cost, ruggedness, interoperability and legacy use in helicopter operations are other important considerations that will be folded into the final downselect.

Display Interface

The large amount of information collected by the Sandblaster landing assist system calls for a simple and intuitive presentation methodology, so as not to overly tax the pilot's attention during the critical terminal landing phase. A simple raster display with a wire-grid or shaded-profile map could provide the critical ground height information in an intuitive way. Other critical information would be presented as overlaid symbology, indicating drift velocity (direction and speed), average ground slope, height above ground, descent rate, and warning indicators for high hazards and moving objects, as well as the landing zone target. The UH-60M cockpit includes a legacy xxx head-down raster display with RS-422 input that could be utilized in this role. Alternately, a new dedicated display could be added to complement the existing display.

Additional non-display-type indicators could be added to enhance the pilot's perception of lateral or fore-and-aft drift without requiring eye contact—for instance a miniature counter-rotating "barber pole" indicator that creates the perception of a moving arrow in the peripheral vision of the pilot. Human-factors studies on such peripheral indicators dates back to the 1960's, with an emphasis on providing maximum motion perception with minimal disturbance to operator attention. The cost, benefit and efficacy of utilizing such indicators to augment raster-type displays for Sandblaster brownout landing assistance will be evaluated and included in the final display downselect.

Variations

While the present invention has been described above in terms of particular embodiments, persons skilled in the art will recognize that many other changes may be made. For example, better resolution could be achieved by providing automatic focusing of the antenna elements. Therefore, the scope of the present invention should be determined by the appended claims and their legal equivalents.

What is claimed is:

1. An imaging system for a rotary aircraft having a millimeter wave imager with visible or infrared overlay comprising:
    A) an active millimeter wave imaging system comprising a millimeter wave transmitter and a millimeter wave phased array receiver for producing millimeter wave images of a landing region,
    B) a second imaging system operating at visible or infrared wavelengths to produce visible or infrared images of the landing region,
    C) a processor programmed with a see and remember algorithm for overlaying the visible or infrared images and the millimeter wave images and to save at least one good high-resolution visible or infrared image in case of a brown-out event begins to obscuring the visible or infrared images wherein in case of the brownout event the millimeter wave images are overlaid on the at least one good visible or infrared image and not obscured visible or infrared images.

2. The system as in claim 1 wherein said millimeter wave imaging system is a video rate imaging system.

3. The system as in claim 1 wherein said millimeter wave imaging system is adapted to operate in a frequency band chosen from the following bands: V-Band, E-Band, W-Band, D-Band and Y-band.

4. The system as in claim 1 wherein said millimeter wave imaging system is a three dimensional imaging system.

5. The system as in claim 1 wherein said millimeter wave imaging system comprises a frequency scanned, phased array antenna adapted to operate at video rates.

* * * * *